(12) United States Patent
Kelkar et al.

(10) Patent No.: US 6,410,681 B1
(45) Date of Patent: Jun. 25, 2002

(54) PROCESS FOR THE PREPARATION OF A POLYESTERAMIDE

(75) Inventors: Ashutosh Anant Kelkar; Shrikant Madhukar Kulkarni; Raghunath Vitthal Chaudhari, all of Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/774,247

(22) Filed: Jan. 30, 2001

(51) Int. Cl.[7] ............................................. C08G 69/08
(52) U.S. Cl. .................................................. 528/310
(58) Field of Search .......................................... 528/310

(56) References Cited

U.S. PATENT DOCUMENTS 4,209,607 A * 6/1980 Shalady et al.

* cited by examiner

Primary Examiner—Terressa Boykin
(74) Attorney, Agent, or Firm—Darby & Darby

(57) ABSTRACT

A process for preparation of alternating polyesteramides comprises reacting carbon monoxide, an aminohydroxy compound and an aromatic polyhalide having at least two halide atoms covalently bonded to an aromatic ring. The said process is conducted in the presence of a solvent, a catalyst and a base.

14 Claims, No Drawings

PROCESS FOR THE PREPARATION OF A POLYESTERAMIDE

FIELD OF THE INVENTION

The present invention relates to the process for preparation of a polyesteramide. More specifically the process relates to the preparation of a polyesteramide by contacting carbon monoxide, an aromatic dihalide and a suitable aminohydroxy compound in presence of a catalyst and a base.

BACKGROUND OF THE INVENTION

Polyesteramides are characterized by presence of amide as well as ester functionality in the polymer backbone and therefore are hybrid structures of polyamides and polyesters. These polymers have attracted strong industrial interest because of their excellent heat resistant properties. Various methods have been described in the prior art for the preparation of polyesteramides. These methods generally involve polycondesation reactions of di-acid or a suitable derivative thereof with an aminohydroxy compound.

U.S. Pat. No. 4855397 discloses the preparation of polyesteramide with lower gas permeability by reacting an amino alcohol and a dicarboxylic acid at elevated temperature. U.S. Pat. No. 4,237,251 discloses a two step process for the preparation of polyesteramides in which the first step is condensation of an aromatic monoalkyl dicarboxylates with an aromatic diisocynate to produce aromatic dialkyl diamidedicarboxylate, which in the second step is condensed with a polyhydroxy compound. U.S. Pat. No. 5,185,424 provides a method for polyesteramide preparation by condensation of aminophenol and hydroquinone derivative with aromatic dicarboxylic acids. U.S. Pat. No. 4,839,441 discloses the condensation of dicarboxylate-capped polyamide with a diol to prepare polyesteramide.

Conventional processes for the preparation of polyesteramides suffer from many drawbacks. Firstly, these require the presence of carboxylic group or a suitable derivative thereof in at least one of the monomers and therefore such process is limited to small number of available carboxylic acids. Secondly, conventional processes require use of carboxylic acids or derivatives thereof like acid chloride etc. which are often sensitive to moisture and difficult to handle. Furthermore, the activity of such dicarboxylic acids or their derivatives towards polycondensation has to be high enough to produce sufficiently high molecular weight polymer for any suitable application.

Because of the commercial interest in polyesteramides, increasing academic as well as industrial attention has been paid towards research in developing new methods for their preparation. In view of the advantages and features of the present invention, the process of this invention would be a significant advance in the current state of the art related to the synthesis of polyesteramides.

OBJECTS OF THE INVENTION

The main object of the invention is to provide a catalytic route for the preparation of polyesteramides free of the drawbacks discussed above.

It is another object of the invention to provide a process for the preparation of a polyesteramide that is easy and efficient.

SUMMARY OF THE INVENTION

Accordingly the present invention provides a process for the preparation of an alternating polyesteramide said process comprising reacting an aromatic dihalide of the general formula (I) X1—Ar—X2 wherein Ar is an aromatic or heteroaromatic residue, X1 and X2 are halogens with an aminohydroxy compound of the general formula (II) $H_2N$—R—OH wherein R is an alkyl, cycloalkyl, aromatic or heteroaromatic residue; in the presence of carbon monoxide, a catalyst, base and solvent to obtain the desired product.

In one embodiment of the invention, the polyhalide compound is an aromatic compound having at least two halide radicals.

In another embodiment of the invention, each of X1 and X2 are independently selected from the group consisting of I and Br.

In a further embodiment of the invention, suitable aromatic compounds include hydrocarbon aromatics such as benzene, biphenyl, anthracene, naphthalene and the like, nitrogen containing aromatics such as pyridine, bipyridine, phenanthroline and the like; sulfur containing aromatics such as benzothiophene, thiophene and the like and oxygen containing aromatics such as dibenzofuran and the like.

In yet another embodiment of the invention, the halide radical may be present on the same ring or on different rings which may be separated by a variety of bridging units like hydrocarbon, aromatics, heteroatoms and the like as exemplified by aryl sulfone, diaryl ethers, diaryl carbonyls, diaryl sulfides, dialkylbenzenes, dialkoxy benzenes and the like.

In another embodiment of the invention, the process is carried out in the presence of a solvent.

In a further embodiment of the invention, the preferred solvents include chlorobenzene, N-methylpyrollidone, DMAc (N,N-Dimethylacetamide), DMF (N,N-Dimethyl formamide), Dimethylesulfoxide, Toluene and Acetonitrile.

In another embodiment of the invention, the aminohydroxy compounds include both aromatic and aliphatic compounds.

In another embodiment of the invention, the compound of formula I is represented by any of the general formulae given below:

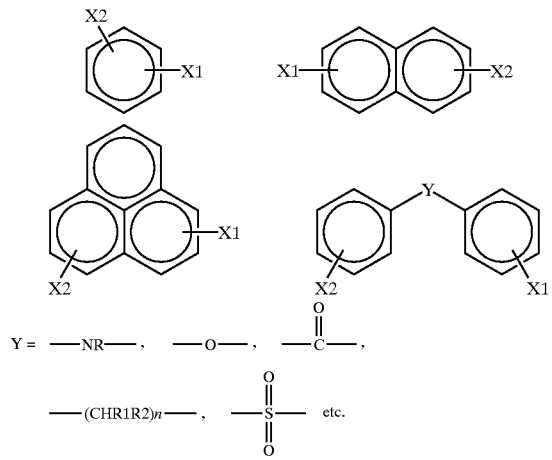

where R = alkyl, aryl, cycloalkyl and n = 0–20.

In a further embodiment of the invention, the aminohydroxy compound contains at least one amino and at least one hydroxyl function.

In a further embodiment of the invention, the amine function may be primary or secondary in nature.

In one embodiment of the invention, the catalyst is selected from the group consisting of palladium, nickel, and platinum based catalysts or a mixture thereof.

In a further embodiment of the invention, the catalyst is selected from the group consisting of palladium bromide, iodide, chloride, perchlorate, organic acids salts such as acetate, trifluoroacetate; organic sulfonic acid salts such as p-toluenesulfonate, methanesulfonate or organometallic compounds like palladium acetylacetonate and the like.

In another embodiment of the invention, the catalyst is selected from the group consisting of $PdCl_2$, $PdBr_2$, $Pd(OAc)_2$, $Ni(OAc)_2$, $NiCl_2$, $Pd(acac)$, $Pd(dba)_{2etc}$.

In another embodiment of the invention, the process of this invention is preferably carried out in presence of a ligand characterized by presence of at least one heteroatom selected from the group containing Nitrogen, Phosphorous, Sulfur and Arsenic or a combination thereof.

In a further embodiment of the invention, the ligand can be monodentate or multidentate, mono and bidentate being preferred.

In a further embodiment of the invention, the monodentate ligands include trialkyl, triaryl or alkylaryl phosphines such as Triphenylphosphine, tri-t-butylphosphine, tri-o-toluylphosphine, tricyclohexylphosphine, diethylphenylphosphine and the like, Nitrogen containing ligands such as Pyridine, quinoline, isoquinoline and the like; Arsenic containing ligands like triphenylarsine, triethylarsine and the like.

In a further embodiment of the invention, the bidentate ligands include 1,2 (diphenylphosphino) ethane, 1,3 (diphenylphosphino)propane; 1,4diphenylphosphino)butane and alike, 2,2'bis(biphenylphosphino)-1,1'binaphthyl (BINAP), 2,2Bipyridine, 1,10Phenanthroline and the like.

In another embodiment of the invention, the ligand to metal mole ratio can be in the range of 0,1 to 100, 1–10 being preferred In another embodiment of the invention, the CO pressure used may be in the range of 0.001 to 300 atm. and preferably in the range of 0.1 to 100 atms. CO used can be diluted by other gases like nitrogen, helium, argon or used alone.

In another embodiment of the invention, the base acting as a neutralizer for the hydrogen halide generated during the course of the reaction is selected from the group consisting of a strong hindered base such as 1,8-Diazabicyclo[5.4.0] undec-7-ene (DBU); 1,5-Diazabicyclo[2.2.0] non-5-ene (DBN); 1,4-Diazabicyclo[2.22] octane (DABCO) etc. or a tertiary amine represented by a general formula $NR_3$, wherein each R is independently selected from a group consisting alkyl, aryl, cycloalkyl systems such as TEA, tri-t-butylamine and the like, inorganic bases like NaOH, $K_2CO_3$ etc. and supported bases like polyvinylpyridine, polyvinylpyrrolidone.

In another embodiment, the temperature in the range of 10–300° C. can be used, the temperature range of 30–20° C. being preferred.

DETAILED DESCRIPTION OF THE INVENTION

It is an advantageous feature of the present invention that it provides a process for the preparation of polyesteramides containing equivalent amounts of ester and amide functions. The process of this invention for the preparation of polyesteramides does not require use of carboxylic acids or derivatives thereof or high temperatures and the starting materials are, in particular stable and easy to handle. The process of the invention results in a wide variety of alternating polyesteramides with high viscosity and at rapid rates of formation. The present invention is described below in more details.

According to the process of the invention, polyesteramides are obtained by reacting an aminohydroxy compound, carbon monoxide and a polyhalide compound. The polyhalide compound is an aromatic compound having at least two halide radicals preferably represented by the general formula X1—Ar—X2 (I), where Ar represents an aromatic residue and each of X1 and X2 can be independently selected form the group consisting of I and Br. The process is not limited to any particular aromatic system and any polyhalide, which may be represented by a general formula (I) that can react under the conditions given in the present invention can be equally used. Suitable aromatic compounds include hydrocarbon aromatics e.g. benzene, biphenyl, anthracene, naphthalene etc.; nitrogen containing aromatics e.g. pyridine, bipyridine, phenanthroline etc.; sulfur containing aromatics e.g. benzothiophene, thiophene etc and oxygen containing aromatics such as dibenzofuran etc. The halide radical may be present on the same ring or on different rings which may be separated by a variety of bridging units like hydrocarbon, aromatics, beteroatoms etc. as exemplified e.g. aryl sulfone, diaryl ethers, diaryl carbonyls, diaryl sulfides, dialkylbenzenes, dialkoxy benzenes etc. Suitable examples of such compounds include the following where X1 and X2 are independently selected from the group consisting of I and Br.

The process according to this invention is preferably carried in presence of solvent. A wide variety of liquids that remain inert under the reaction conditions can serve as solvents. The examples of preferred solvents include chlorobenzene, N-methylpyrollidone, DMAc (N, N-Dimethylacetamide), DMF (N,N-Dimethyl formamide), Dimethylesulfoxide, Toluene, Acetonitrile etc. There is no limit on the amount of solvent used and it may be decided on other process-related issues like stirability, solubility of reactants, process economics etc.

The polyesteramides are prepared by reacting aromatic dihalide, carbon monoxide and an aminohydroxy compound including both aromatic and aliphatic compounds containing at least one amino and at least one hydroxyl function. The amine function may be primary of secondary in the nature Such compounds are preferably represented by the general formula $H_2N$—R—OH (II) where R can be aliphatic, aromatic, and acyclic. Each of the anamine and hydroxyl function may be present on the same aromatic moiety or on the adjacent carbon atoms in case of aliphatic compounds or be separated by a variety of bridging units as stated for the dihalides. The aliphatic amino hydroxyl compounds may have 1 to 25 carbon atoms and may be branched or linear. Examples of such aminohydroxy compounds include ortho, meta and para-aminopheols, linear or branched alkylamino alcohols containing upto 20 carbon atoms e.g. ethanolamine; 1,3 propanolamine 4-amino-benzylalcohol; 1,4 butanolamine etc.

The catalyst contains at least one of the metals selected form the group comprising of Palladium, Nickel and Platinum or a mixture thereof. The metal may be present in the zero state or in higher oxidation sates. Variety of compounds can serve as source for the metal in the catalyst. Suitable examples include salts of inorganic acids e.g. bromide, iodide, chloride, perchlorate etc., salts of organic acids e.g. acetate, trifluoroacetate etc.; salts of organic sulfonic acids e.g. p-toluenesulfonate, methanesulfonate etc. or organometallic compounds like palladium acetylacetonate etc. The representative examples for such catalysts include $PdCl_2$, $PdBr_2$, $Pd(OAc)_2$, $Ni(OAc)_2$, $NiCl_2$, $Pd(acac)$, $Pd(dba)_{2etc}$.

In another embodiment, the process of this invention is preferably carried out in presence of a ligand characterized by presence of at least one heteroatom selected form the group containing Nitrogen, Phosphorous, Sulfur and Arsenic or a combination thereof The ligand can be monodentate or multidentate, mono and bidentrate being preferred. The suitable examples of monodentate ligands include trialkyl, triaryl or alkylaryl phosphines eg. Triphenylphosphine, tri-t-butylphosphine, tri-o-toluylphosphine, tricyclohexylplhosphine, diethylphenylphosphine etc., Nitrogen containing ligands e.g. Pyridine, quinoline, isoquinoline etc.; Arsenic containing ligands like triphenylarsine, triethylarsine etc. The suitable examples of bidentate ligands include 1,2(diphenylphosphino)ethane; 1,3(diphenylphosphino)propane; 1,4 diphenylphosphino)butane and alike, 2,2'bis(biphenylphosphino)-1'binaphthyl (BINAP), 2,2Bipyridine; 1,10Phenanthroline etc. The ligand to metal mole ratio can be in the range 0.1 to 100, 1–10 being preferred.

The amount of catalyst used in the process of this invention may vary within wide limits and there is no real upper level for it. Because of the very high activities of the proposed catalytic system very low amounts of catalyst may be employed. Typically the $10^{-4}$ to $10^3$ mol percent of the palladium may be employed with respect to the dihalide component added, the range of 0.001 to 10 being preferred.

The CO pressure used may be in the range of 0.001 to 300 atm. and preferably in the range of 0.1 to 100 atms. CO used can be diluted by other gases like nitrogen, helium, argon etc. or used alone.

The process according to the present invention is carried out in presence of base acting as a neutralizer for the hydrogen halide generated during the course of the reaction. Preferably the base used is a strong hindered base such as 1,8-Diazabicyclo[5.4.0] undec-7-ene (DBU); 1,5-Diazabicyclo[2.2.0] non-5-ene (DBN); 1,4-Diazabicyclo[2.2.2] octane (DABCO) etc. or a tertiary amine represented by a general formula $NR_3$, wherein each R is independently selected from a group consisting alkyl, aryl, cycloalkyl systems e.g. TEA, tri-t-butylamine etc. Alternatively inorganic bases like NaOH, $K_2CO_3$ etc. and supported bases like polyvinylpyridine, polyvinylpyrrolidone etc. can also be used. Other sources like zeolite-Y that can trap the hydrogen halide can also be used. The amount of a base employed should be sufficiently enough to neutralize all the hydrogen halide generated during the course of reaction. Alternatively an excess of base may be used if desired.

The temperature in the range of 10–300° C. can be used, the temperature range of 30–200° C. being preferred. The reaction time is not a true variable of and depends on the nature and amounts of reactants, catalyst, solvent, pressure, temperature etc. Typically the reaction time of 0.001 to 100 hours can be used and may vary according to need.

It is obviously preferred that the compounds used, according, to present invention, are stable and free from any other functionality which may react under the reaction conditions or retard the formation of desired product.

The embodiments and examples described here to illustrate the catalyst activity and the process by no way limit the scope of the present invention and variety of similar type of substrates, that react in presence of said catalyst and conditions, to give polyesteramides can be used.

The present invention is described in more details in reference to following examples

EXAMPLE 1

A clean, dry autoclave was charged with 4,4 diiodobiphenyl (1.015 gm, 2.5 mmole); 1.3 propanolamine (0.075 gm, 2.5 mmole); 1,8-Diazabicyclo[5.4.0]undec-7-ene (DBU) (1.65 ml, 5.5 mmole), $PdCl_2$ (17.5 gm, 0.1 mmole) triphenylphosphine (104 mg, 0.4 mmole); and 20 ml of monochlorobenzene. The autoclave was then flushed with nitrogen thrice and then twice with high purity carbon monoxide and heated to 120° C. under slow stirring. After attaining the temperature, the autoclave was pressurized to 300 psig of carbon monoxide and the contents were vigorously stirred (900 rpm) using the magnetically driven stirrer. The reaction was continued for 3 hours after which the autoclave was cooled to room temperature and the excess gas was vented off. The polymer separated as a viscous material. The total contents were poured in methanol (100 ml) separating the solid product. The product was washed with methanol twice, re-dissolved in N-methylpyrrolidone and re-precipitated using methanol. The product was dried under vacuum. The inherent viscosity measured in NMP was 1.5 dL/g at a concentration of 0.3 g/100 ml at 30° C.

Yield=452 mg (70%)

IR peaks (cm$^{-1}$): 3402, 1715, 1634, 1605, 1541, 1378, 1275, 1179, 1104, 1004, 1068, 839, 757.

EXAMPLE 2

The procedure in the example 1 was repeated except for the change that 4-aminophenol (0.273 gm, 2.5 mmol) was used in place of 1,3 propanolamine. After continuing the reaction for 3 hours, the reactor was cooled and the excess gases were vented off The solid separated was treated with methanol and dried under vacuum. The product was insoluble in common organic solvents.

The product separated as a solid and it was insoluble in common organic solvents.

Yield=0.750 gm (95%)

IR peaks: 3400, 1725, 1650, 1605, 1520, 1380, 1282, 1200, 1080.

EXAMPLE 3

The procedure in example 2 was repeated except for the change that 3-aminophenol (0.273 gm, 2.5 mmole) was used in place of 4-aminophenol. After continuing the reaction for 3 hours, the reactor was cooled and the excess gases were vent off. The sticky mass obtained was treated with methanol to give amorphous powder after drying in vacuum. The product was insoluble in common organic solvents.

Yield=0.600 gm, (60%)

IR peaks 3402, 1725, 1660, 1610, 1530, 1370, 1250, 1150, and 1070.

EXAMPLE 4

The procedure in example 2 was repeated except for the change that 1,4 dibromobenzene (0.590 gm, 2.5 mmole) was used in place of 4,4'diiodobiphenyl. After continuing the reaction for 3 hours, the reactor was cooled and the excess gases were vented off. The solid product separated was treated with methanol and dried under vacuum. The product was insoluble in common organic solvents.

Yield=0.521 gm, (90%)

IR peaks, 3402, 1725, 1660, 1610, 1530, 1370, 1250, 1150, and 1070.

EXAMPLE 5

The procedure in the example 1 was repeated except for the change that the reaction temperature was 130° C. After continuing the reaction for 3 hours, the reactor was cooled and the excess gases were vented off. The solid separated was treated with methanol and dried under vacuum. The inherent viscosity measured in NMP was 1.45 dL/g at a concentration of 0.3 g/100 ml at 30° C.

Yield=452 mg (70%)

We claim:

1. A process for the preparation of an alternating polyesteramide comprising contacting an aromatic dihalide of the general formula (I) X1—Ar—X2 wherein Ar is an aromatic or heteroaromatic residue, X1 and X2 are halogens, with an aminohydroxy compound of the general formula (II) $H_2N$—R—OH wherein R is an alkyl, cycloalkyl, aromatic or heteroaromatic residue; in the presence of carbon monoxide, a catalyst, base and solvent to obtain the desired product.

2. A process as claimed in claim 1 wherein Ar is selected from the group consisting of phenyl, biphenyl, naphthyl, anthracyl, phenanthryl, phenylether, diphenylsulfone, diphenylketone, biphenyl sulfide, pyridine, quinoline, bipyridine and phenanthroline.

3. A process as claimed in claim 1 wherein the compound of formula I is represented by any of the general formulae given below:

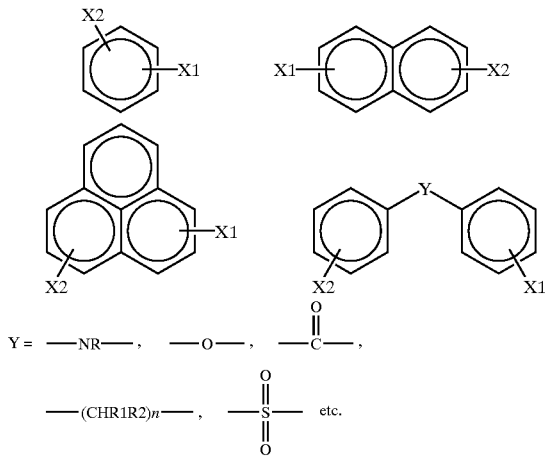

where R = alkyl, aryl, cycloalkyl and n = 0–20.

4. A process as claimed in claim 1 wherein R is an alkyl chain consisting of up to 40 carbon atoms or an aromatic radical of claim 2.

5. A process as claimed in claim 1 wherein the catalyst used is selected from the group consisting of Palladium, Nickel and Platinum based catalysts, or a mixture thereof.

6. A process as claimed in claim 1 wherein the process can be carried out in the presence of a ligand at least one heteroatom selected from the group consisting of N, P, As and S.

7. A process as claimed in claim 6 wherein the ligand used is selected from the group consisting of triphenylphosphine, tributylphosphine, triphenylarsine, bipyridine, phenanthroline, o-tolylphosphine, 1,3diphenylphosphinopropane and 1,4 diphenylphosphinobutane.

8. A process as claimed in claim 1 wherein the base used is selected from the group consisting of 1,8-Diazabicyclo[5.4.0]undec-7-ene (DBU); 1,5-Diazabicyclo[2.2.0]non-5-ene (DBN) and 1,4-Diazabicyclo[2.2.2]octane (DABCO) triethylamine.

9. A process as claimed in claim 1 wherein the solvent employed is selected from the group consisting of monochlorobenzene, N,N-Dimethylacetamide; N,N-Dimethylformamide, N-Methylpyrollidone and Toluene.

10. A process as claimed in claim 1 wherein the catalyst used is a palladium compound.

11. A process as claimed in claim 1 wherein the CO pressure is in the range of 0.01 to 200 atm.

12. A process as claimed in claim 1 wherein the reaction is carried out in a temperature range of 20 to 300° C.

13. A process as claimed in claim 1 wherein the aromatic dihalide is 4,4'diiodobiphenyl and the aminohydroxy compound comprise $C_1$ to $C_{10}$ aminoalcohols.

14. A polyesteramide obtained using the process as claimed in any one of claims 1 to 13.

* * * * *